United States Patent [19]

Hanada

[11] Patent Number: 5,908,808
[45] Date of Patent: Jun. 1, 1999

[54] BACK-SIDE COATING FORMULATIONS FOR HEAT-SENSITIVE RECORDING MATERIALS AND HEAT-SENSITIVE RECORDING MATERIALS HAVING A BACK LAYER COATED THEREWITH

[75] Inventor: Kazuyuki Hanada, Tokyo, Japan

[73] Assignees: Dainichiseika Color & Chemicals Mfg. Co., Ltd.; Ukima Colour & Chemicals Mfg. Co., Ltd., both of Tokyo, Japan

[21] Appl. No.: 08/909,885

[22] Filed: Aug. 12, 1997

Related U.S. Application Data

[62] Division of application No. 08/506,521, Jul. 25, 1995, Pat. No. 5,700,868.

[51] Int. Cl.$^6$ .............................. B41M 5/20; B41M 5/24; B32B 27/00; B32B 27/40
[52] U.S. Cl. .................. 503/227; 428/195; 428/423.1; 428/425.1; 428/447; 428/488.4; 428/913; 428/914
[58] Field of Search ................................. 428/423.1, 195, 428/425.1, 447, 488.4, 913, 914; 503/227

[56] References Cited

U.S. PATENT DOCUMENTS

| | | | |
|---|---|---|---|
| 4,837,198 | 6/1989 | Kuriyama et al. | 503/227 |
| 4,853,418 | 8/1989 | Hanada et al. | 521/154 |
| 4,895,829 | 1/1990 | Hanada et al. | 503/227 |
| 4,910,087 | 3/1990 | Torii et al. | 428/423.1 |
| 4,942,212 | 7/1990 | Hanada et al. | 528/28 |
| 5,068,295 | 11/1991 | Misaizu et al. | 526/245 |
| 5,192,736 | 3/1993 | Hanada et al. | 503/226 |
| 5,262,492 | 11/1993 | Hanada et al. | 525/415 |
| 5,321,083 | 6/1994 | Hanada et al. | 525/102 |
| 5,384,365 | 1/1995 | Hanada et al. | 525/105 |

*Primary Examiner*—Patrick D. Niland
*Attorney, Agent, or Firm*—Oblon, Spivak, McClelland, Maier & Neustadt, P.C.

[57] ABSTRACT

Described is a back-side coating formulation for a heat-sensitive recording material. The coating formulation comprises, in a liquid medium, a reaction product obtained by reacting (a) a polysiloxane compound containing at least one functional group reactive with an isocyanate group, (b) a silane coupling agent containing at least one functional group selected from a functional group reactive with an isocyanate group or an isocyanate group, and (c) a polyisocyanate. The reaction product has been obtained by conducting the reaction under the condition of R>1 or R≦1, R being an equivalent ratio of isocyanate group(s) to group(s) reactive with isocyanate group(s) (isocyanate group(s)/group(s) reactive with isocyanate group(s)) and in the case of R≦1, the silane coupling agent contains at least one hydrolyzable group in addition to the reactive group.

7 Claims, No Drawings

BACK-SIDE COATING FORMULATIONS FOR HEAT-SENSITIVE RECORDING MATERIALS AND HEAT-SENSITIVE RECORDING MATERIALS HAVING A BACK LAYER COATED THEREWITH

This is a Division of application Ser. No. 08/506,521 filed on Jul. 25, 1995, now U.S. Pat. No. 5,700,868.

BACKGROUND OF THE INVENTION

1) Field of the Invention

The present invention relates to coating formulations useful for the formation of a back layer on heat-sensitive recording materials such as wax-type thermal transfer materials or sublimation-type thermal transfer materials.

The present invention is also concerned with heat-sensitive recording materials having a back layer coated therewith.

2) Description of the Related Art

Conventionally-known transfer processes include thermal ink-transfer processes and sublimation-type thermal transfer processes. According to the former processes, a heat-resistant recording layer is formed on a base sheet such as a polyester film by having a dye or pigment carried together with a binder resin on one side of base sheet. The base sheet is heated in a pattern from the back side thereof so that the dye or pigment is transferred onto a material to be transferred. According to the latter processes, a heat sub-limation dye is employed and the dye alone is caused to sublimate so that it is transferred onto a material to be transferred.

In each of these processes, thermal energy is applied from the back side of a base sheet. The back side of the base sheet of a heat-sensitive transfer material to be employed is therefore required to have sufficient lubricity, releasability, non-stickiness and the like so that a thermal head does not stick on the back side, in other words, does not develop any sticking problem.

It has therefore been the conventional practice to form a layer of a silicone resin, melamine resin, phenol resin, polyimide resin, epoxy resin or modified cellulose resin or a mixture thereof on the back side of the base sheet of a heat-sensitive recording material (see Japanese Patent Publication No. SHO 58-13359).

Most of these resins are, however, thermosetting resins making use of various curing agents. A heating step is therefore required for curing upon formation of a back layer on a heat-sensitive recording material, leading to the problem that the production process is cumbersome. Moreover, so-formed back layer itself is weak and is inferior in adhesion in spite of its high melting point, leading to the problem that the film layer may peel off as dust particles upon printing and may give a trouble to a thermal head.

With a view toward overcoming the problems described above, it has been proposed to add an isocyanate or the like to a thermoplastic resin such as an acrylic resin, polyurethane resin, polyester resin or polybutadiene resin and then to cure the resulting resin to provide a back layer and, further, to incorporate a lubricant or the like in the resulting resin to allow a thermal head to smoothly slide thereon (Japanese Patent Application Laid-Open No. SHO 59-225994).

According to the above patent publication, the curing of the isocyanate is said to proceed at room temperature. In practice, however, the above proposal has the problems that the pot life is insufficient and the resulting resin may not be cured sufficiently due to reactions of the isocyanate with water and other impurities.

In addition, the lubricant added to provide the back layer with smooth sliding property is accompanied by the potential problems that it may bleed out on the surface of the back layer if used for a long time, or may produce dusts on a head during printing.

The present inventors have already proposed that the use of a silicone copolymer resin in stead of the above-mentioned resins for the formation of a back layer can provide a heat-sensitive recording material excellent in various properties such as heat resistance, lubricity and non-stickiness (see Japanese Patent Application Laid-Open Nos. SHO 61-227087 and 62-202786).

SUMMARY OF THE INVENTION

An object of the present invention is therefore to make further improvements over the conventional technology and to provide a back-side coating formulation which can simplify the formation process of the back layer and has excellent properties such as sufficient lubricity (small coefficient of friction), non-stickiness to a head of a recording device, and the like, thereby not staining the head.

Another object of the present invention is to provide a heat-sensitive recording material with a back layer of the above-described excellent properties thereon.

The above objects can be attained by the present invention to be described below. The present invention therefore provides a back-side coating formulation for a heat-sensitive recording material, which comprises, in a liquid medium, a reaction product obtained by reacting (a) a polysiloxane compound containing at least one functional group reactive with an isocyanate group, (b) a silane coupling agent containing at least one functional group selected from a functional group reactive with an isocyanate group or an isocyanate group, and (c) a polyisocyanate. The reaction product has been obtained by conducting the reaction under the condition of R>1 or R≦1, R being an equivalent ratio of isocyanate groups to group(s) reactive with isocyanate groups (isocyanate group(s)/group(s) reactive with isocyanate group(s)) and in the case of R≦1, the silane coupling agent contains at least one hydrolyzable group in addition to the reactive group.

A back layer of a heat-sensitive recording material is formed using a reaction product obtained by reacting a polysiloxane compound containing an organic functional group, a silane coupling agent containing an organic functional group and an organic polyisocyanate. The back layer therefore contains a free isocyanate group or a free isocyanate group and a hydrolyzable silyl group so that the back layer can be crosslinked by water or moisture in the air. A coating can therefore be cured despite its single pack form thereby making it possible to simplify the forming steps of a back layer. In addition, the adhesion of the back layer to the base sheet material has been improved owing to the inclusion of free isocyanate groups and/or hydrolyzable silyl groups. Thus, heat-sensitive recording materials having excellent properties can be obtained according to the present invention.

DETAILED DESCRIPTION OF THE INVENTION AND PREFERRED EMBODIMENTS

Preferred examples of the polysiloxane compounds containing one or more functional groups reactive with an isocyanate group, said polysiloxane compound being one of the film-forming components of the coating formutation according to the present invention may include following compounds:

(1) Amino-modified polysiloxane compounds:

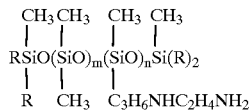

wherein m=1–10, n=2–10, and R=CH$_3$ or OCH$_3$.

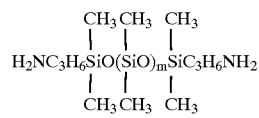

wherein m=0–200.

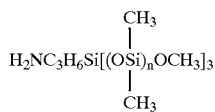

wherein n=2–10.

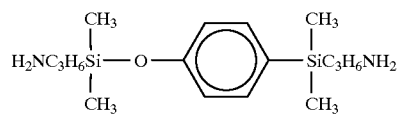

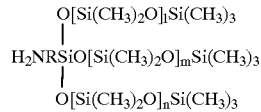

wherein branched sites=2 or 3, R=lower alkyl, l=2–200, m=2–200, and n=2–200.

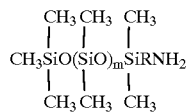

wherein m=1–200, and R=lower alkyl.

(2) Epoxy-modified polysiloxane compounds:

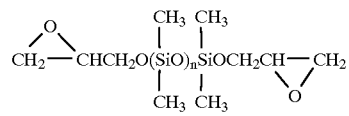

wherein n=1–200.

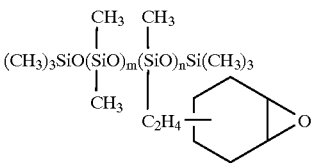

wherein m=1–10, and n=2–10.

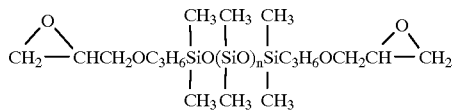

wherein n=1–200.

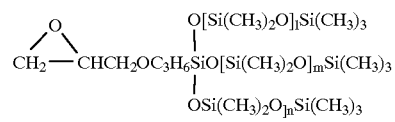

wherein branched sites=2 or 3, l=2–200, m=2–200, and n=2–200.

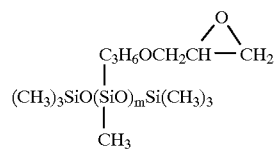

wherein m=1–10.

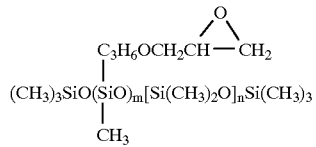

wherein m=1–10, and n=2–10.

The above epoxy compounds can be used after introducing an active hydrogen atom in at least one end thereof by reacting them with a polyol, polyamide, polycarboxylic acid or the like.

(3) Alcohol-modified polysiloxane compounds:

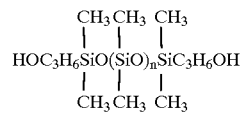

wherein n=1–300.

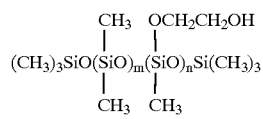

wherein m=1–300 and n=2–50.

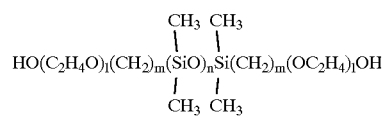

wherein l=1–200, m=2–6 and n=1–400.

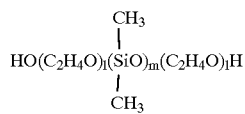

wherein l=1–200 and m=1–200.

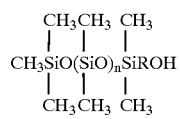

wherein=1–400, and R=lower alkyl.

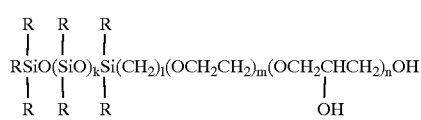

wherein R=CH$_3$ or OCH$_3$, R'=hydrogen atom or alkyl group, k=1–250, l=0–5, m=0–50, and n=1–3.

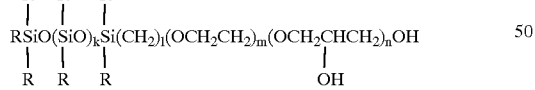

wherein R=CH$_3$ or OCH$_3$, k=1–250, l=0–5, m=0–50, and n=1–3.

(4) Mercapto-modified polysiloxane compounds:

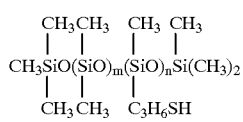

wherein m=1–20, and n=2–100.

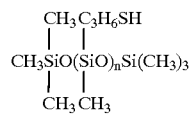

wherein n=2–100.

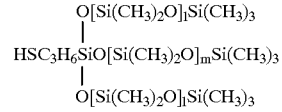

wherein branched sites: 2 or 3, l=2–200, m=2–200, and n=2–200.

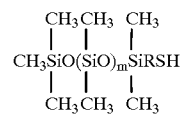

wherein n=1–300, and R=lower alkyl.

(5) Carboxyl-modified polysiloxane compounds:

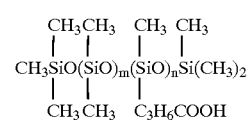

wherein m=1–200, and n=2–50.

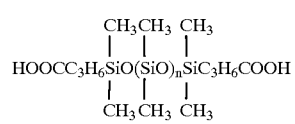

wherein n=1–200.

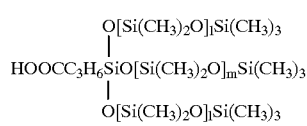

wherein branched sites: 2 or 3, l=2–200, m=2–200, and n=2–200.

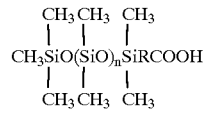

wherein n=1–200, and R=lower alkyl.

It is to be noted that the above polysiloxane compounds each containing one or more functional groups reactive with an isocyanate group are merely illustrative of polysiloxane compounds preferred in this invention and this invention is not necessarily limited to such exemplified polysiloxanes. Not only the above-exemplified compounds but also other polysiloxane compounds which are commercially sold these days and are hence readily available on the market are all usable in the invention.

Examples of the silane coupling agents usable in the present invention, each of which contains at least one reactive group selected from functional groups reactive with an isocyanate group or isocyanate groups may include following compounds:

(1) Silane coupling agents each of which contains at least one free isocyanate group and is represented by the following formula:

$$(R^1O)_n\text{—}\underset{\underset{(R^2)_m}{|}}{Si}\text{—}X\text{—}NCO$$

wherein $R^1$ represents a lower alkyl group, $R^2$ represents a lower alkyl or lower alkoxy group, X represents a divalent organic group, preferably a $C_{0\text{-}50}$ aliphatic, aromatic or aliphatic aromatic group which may contain therein an atom or atomic group such as O, N, S or the like as a bond group, m stands for an integer of 0–3 and n equals 3 minus m.

Specific examples of the silane coupling agent containing a free isocyanate group include:

(1) $(CH_3O)_3Si(CH_2)_3NCO$
(2) $(C_2H_5O)_3Si(CH_2)_3NCO$
(3) $(CH_3O)_2CH_3Si(CH_2)_3NCO$
(4) $(C_2H_5O)_2CH_3Si(CH_2)_3NCO$
(5) $(CH_3O)_3SiNCO$
(6) $(CH_3O)_2Si(NCO)_2$
(7) $C_2H_5OSi(NCO)_3$
(8) $CH_3OSi(NCO)_3$ (2) Silane coupling agents, each of which contains at least one reactive group other than a free isocyanate group and is represented by the following formula:

$$(R^1O)_n\text{—}\underset{\underset{(R^2)_m}{|}}{Si}\text{—}X\text{—}Y$$

wherein Y represents a functional group, which is reactive with the above-exemplified isocyanate group, such as amino, epoxy, hydroxyl and thiol, with amino, thiol and hydroxyl being most preferred, $R^1$, $R^2$, X, m and n have the same meanings as above.

Preferred specific examples of the silane coupling agent which contains at least one reactive group include:

(1) 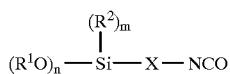 $(CH_3O)_2Si(CH_2)_3NH(CH_2)_2NH_2$
(2) $(C_2H_5O)_2Si(CH_2)_3NH(CH_2)_2NH_2$ (with CH_3 substituent)
(3) $(CH_3O)_3CH_3Si(CH_2)_3NH(CH_2)_2NH_2$
(4) $(C_2H_5O)_2Si(CH_2)_3NH(CH_2)_2NH_2$
(5) $(CH_3O)_3Si(CH_2)_3NH_2$
(6) 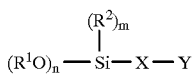 $(CH_3O)_2Si(CH_2)_3OCH_2CH\text{—}CH_2$ (with CH_3 and epoxide O)
(7) 
(8) $(C_2H_5O)_2Si(CH_2)_3OCH_2CH\text{—}CH_2$ (with CH_3 and epoxide O)
(9) $(CH_3O)_2Si(CH_2)_2$-cyclohexyl epoxide
(10) $(C_2H_5O)_2Si(CH_2)_3SH$
(11) $(CH_3O)_2Si(CH_2)_3SH$
(12) $(CH_3O)_2Si(CH_2)_3Ph\text{-}CH_2NH(CH_2)_2NH_2$ It is to be noted that the above-listed silane coupling agents are merely illustrative of the compounds preferred in this invention and the invention is not necessarily limited to such exemplified compounds. The above-exemplified compounds and other known compounds which are commercially sold these days and are hence readily available on the market are all usable in the invention.

As the organic polyisocyanate to be reacted with the above polysiloxane compound or the above silane coupling agent in the present invention, conventionally-known polyisocyanates are all usable. Preferred examples of polyisocyanates include:

Toluene-2,4-diisocyanate,
4-Methoxy-1,3-phenylene diisocyanate,
4-Isopropyl-1,3-phenylene diisocyanate,
4-Chloro-1,3-phenylene diisocyanate,
4-Buthoxy-1,3-phenylene diisocyanate,
2,4-Diisocyanate-diphenylether,
Methylene diisocyanate,
4,4-Methylenebis(phenyl isocyanate),
Durylene diisocyanate,
1,5-Naphthalene diisocyanate,
Benzidine diisocyanate,
o-Nitrobenzidine diisocyanate,
4,4-Diisocyanate dibenzyl,
1,4-Tetramethylene diisocyanate,
1,6-Tetramethylene diisocyanate,
1,10-Decamethylene diisocyanate,
1,4-Cyclohexylene diisocyanate,
Xylylene diisocyanate,
4,4-Methylenebis(cyclohexyl isocyanate), and
1,5-Tetrahydronaphthalene diisocyanate.

Adducts of the above-described organic polyisocyanates with other compounds, for example, those represented by the following formulas can also be mentioned, although the invention is not limited to the use of these examples.

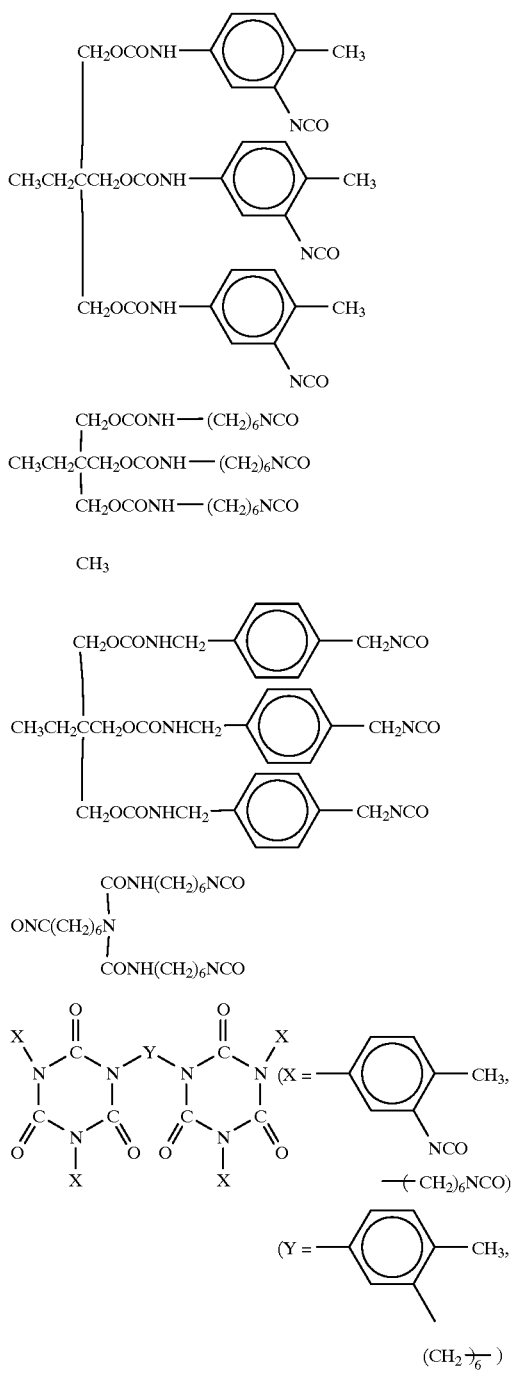

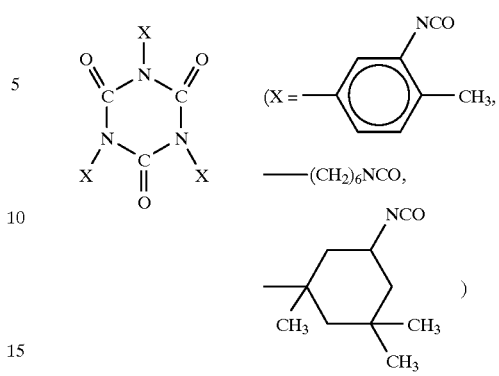

Urethane prepolymers and the like, which are obtained by reacting these organic polyisocyanates with low-molecular-weight polyols or polyamines into isocyanate-terminated polymers, can of course be used.

The reaction product used in the present invention can be obtained by reacting the above-described components in such a way that an equivalent ratio R of isocyanate group(s) to functional group(s) reactive with isocyanate group(s) (isocyanate group(s)/functional group(s) reactive with the isocyanate group(s)) is >1 or $\leq 1$ and in the case of $R \leq 1$, the silane coupling agent contains at least one hydrolyzable group in addition to the reactive group.

(i) In the case of R>1, the reaction product contains at least one free isocyanate group. If a silane coupling agent similar to that employed in the case of $R \leq 1$, the reaction product also contains at least one hydrolyzable silyl group.

Such a reaction product can be easily obtained by reacting, in a solventless manner or in an organic solvent, in the presence or absence of an ordinary urethane catalyst, at about 0–150° C., preferably 20–80° C., for about 10–4 hours, 1–3 moles of a polysiloxane compound containing such functional group or groups as described above, 1–3 moles of a silane coupling agent containing such a reactive group or groups as described above and 1–2 moles of such an organic polyisocyanate as described above at a functional group ratio such that among such organic functional groups and isocyanate groups, at least one excess isocyanate group is contained per molecule.

(ii) In the case of $R \leq$, in a solventless manner or in an organic solvent, in the presence or absence of an ordinary urethane catalyst, at about 0–150° C., preferably 20–80° C., for about 10–4 hours, the reaction product does not contain any free isocyanate group but contains at least one hydrolyzable silyl group.

Such a reaction product can be obtained easily by reacting under the above-described reaction conditions 1–3 moles of a polysiloxane compound containing such functional group or groups as described above, 1–3 moles of a silane coupling agent containing such a reactive group or groups as described above and 1–2 moles of such an organic polyisocyanate as described above in such a way that the equivalents of such organic functional groups become substantially the same as that of such isocyanate groups.

(iii) When the silane coupling agent is not employed, the reaction product containing only at least one free isocyanate group can be obtained.

In this case, the reaction product can be obtained by reacting the polyisocyanate and the polysiloxane at such a functional group ratio that at least one excess isocyanate group is contained per molecule.

In the present invention, the reaction product used for the formation of a back layer can be contained singly in a liquid medium. As an alternative, the liquid medium can contain it together with one or more of conventionally known various resin binders to improve the coatability to a basic sheet material or the like and the film forming property.

As these resin binders, those chemically reactive with one or more free isocyanate groups in the reaction product useful in the practice of the present invention are preferred. However, those having no such reactivity can still be used in the present invention.

Examples of the resin include acrylic resins, polyurethane resins, polyester resins, polybutadiene resins, silicone resins, melamine resins, phenol resins, PVC resins, cellulose resins, epoxy resins, polyvinyl butyral resins, alkyd resins, modified cellulose resins, fluorine resins and polyamide resins. Further, those modified with silicone or fluorine can also be used. When two or more of these resins are used in combination, they are added, in an amount of 0.1 wt. % to 100 wt. % in terms of solid content, to the reaction product.

The back layer formed by the coating formulation of the present invention is brought into contact with moisture in the air, water, steam or the like, the hydrolyzable silyl groups therein undergo a crosslinking reaction, leading to the curing of the agent. No special heating apparatus or heat treatment for curing is therefore required.

In the present invention, it is preferable to add a catalyst to the coating formulation for the back layer in order to accelerate the above silanol condensation. Examples of the catalyst include carboxylate salts such as alkyl titanate salts, tin octylate, and dibutyltin dilaurate; amine salts such as dibutylamine-2-ethylhexoate; and other acidic and basic catalysts.

Some free isocyanate groups and silyl groups interact with the surface of the base sheet material, thereby improving the adhesion of the back layer. In addition, polysiloxane moieties in the reaction product are oriented on the surface of the back layer. The present invention therefore makes it possible to provide a heat-sensitive recording material having excellent properties such as high heat resistance, high lubricity and development of less head smear.

EXAMPLES

The present invention will hereinafter be described more specifically by the following referential examples, examples and comparative examples, in which all designations of "part or parts" and "%" are on a weight basis unless otherwise specifically indicated.

Referential Example 1

While 150 parts of an adduct of hexamethylene diisocyanate and water ("Duraconate 24A-100", trade name; product of Asahi Chemical Industry Co., Ltd.; NCO %=23.5) and 100 parts of ethyl acetate were stirred thoroughly at 80° C., 12 parts of hydroxyl-terminated polydimethylsiloxane (molecular weight: 2,200) having the structure represented by the following formula:

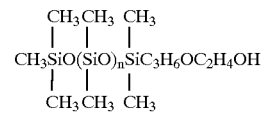

(wherein n is a value to give a molecular weight of 2,200) were gradually added dropwise and were reacted for 4 hours. The reaction mixture was thereafter cooled to 40° C. While thoroughly stirring, 56 parts of 3-aminopropyltriethoxysilane were gradually added dropwise to the reaction mixture and they were reacted, whereby the reaction product (1) was obtained.

In an infrared absorption spectrum of the reaction product (1) so obtained, an absorption by free isocyanate groups was observed at 2,270 cm$^{-1}$ and an absorption band based on —SiO— groups was also observed at 1,090 cm$^{-1}$.

As a result of a quantitative analysis of free isocyanate groups of the reaction product (1), their content was found to be 10.3% while the theoretical value is 11.1%.

As a first step, ethyl acetate was added to the reaction product to obtain a resin solution (A) having a solid content of 50%.

Referential Example 2

While 200 parts of an adduct of trimethylol propane and toluene-2,4-diisocyanate at a molar ratio of 1:3 ("Colonate L", trade name; product of Nippon Polyurethane Co., Ltd.; NCO %=13.0; solid content: 75%) and 100 parts of ethyl acetate were stirred thoroughly at 80° C., 12 parts of polydimethylsiloxane (molecular weight: 3,200) which has hydroxyl groups at both ends thereof and is represented by the following formula:

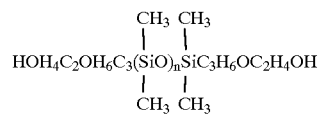

(wherein n is a value to give a molecular weight of 3,200) were gradually added dropwise for reaction.

The resulting mixture was then cooled to 40° C. While thoroughly stirring, 62 parts of N-ethyl-γ-aminopropyltriethoxysilane were gradually added dropwise to the mixture, followed by reaction, whereby a reaction product (2) was obtained.

In an infrared absorption spectrum of the reaction product (2) so obtained, an absorption by free isocyanate groups was observed at 2,270 cm.$^{-1}$ and an absorption band based on —SiO— groups was also observed at 1,090 cm$^{-1}$.

As a result of a quantitative analysis of free isocyanate groups in the reaction product (2), their content was found to be 5.1% while the theoretical value is 6.9%.

To the reaction product (2), ethyl acetate was added to obtain a resin solution (B) having a solid content of 50%.

Referential Example 3

While 150 parts of a trimer of hexamethylene diisocyanate ("Colonate EH", trade name; product of Nippon Polyurethane Co., Ltd.; NCO %=21.3) and 100 parts of ethyl acetate were stirred thoroughly at 80° C., 10 parts of polydimethylsiloxane (molecular weight: 2,200) which has a similar structure to that of Referential Example 1 were gradually added dropwise, followed by reaction.

While thoroughly stirring them at 50° C., 7 parts of polydimethylsiloxane (molecular weight: 1,800) which has amino groups at both ends thereof and is represented by the following formula:

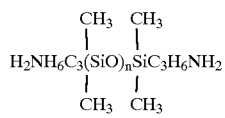

(wherein n is a value to give a molecular weight of 1,800) were gradually added dropwise and then, 72 parts of γ-mercaptopropyltrimethoxysilane were gradually added dropwise, followed by reaction, whereby the reaction product (3) was obtained.

In an infrared absorption spectrum of the reaction product (3) so obtained, an absorption by free isocyanate groups was observed at 2,270 $cm^{-1}$ and an absorption band based on —SiO— groups was also observed at 1,090 $cm^{-1}$.

As a result of a quantitative analysis of free isocyanate groups in the reaction product (3), their content was found to be 5.7% (in terms of a purity content) while the theoretical value is 6.6%.

As a final step, ethyl acetate was added to the reaction product (3) to obtain a resin solution (C) having a solid content of 50%.

Example 1

The resin solution (A) (100 parts) obtained in Referential Example 1, 300 parts of methyl ethyl ketone, 0.5 part of water and 0.01 part of tin octylate were mixed and stirred thoroughly, whereby a coating formulation of the present invention for the formation of the back layer of a heat-sensitive recording material was obtained.

Example 2

The resin solution (A) (100 parts) obtained in Referential Example 1, 20 parts of a nitrocellulose resin (solid content: 20%; product of Daicel Chemical Industries, Ltd.), 312 parts of methyl ethyl ketone, 0.5 part of water and 0.01 part of tin octylate were mixed and stirred thoroughly, whereby a coating formulation of the present invention for the formation of the back layer of a heat-sensitive recording material was obtained.

Example 3

The resin solution (B) (100 parts) obtained in Referential Example 2, 300 parts of methyl ethyl ketone, 0.5 part of water and 0.01 part of tin octylate were mixed and stirred thoroughly, whereby a coating formulation of the present invention for the formation of the back layer of a heat-sensitive recording material was obtained.

Example 4

The resin solution (B) (100 parts) obtained in Referential Example 2, 30 parts of a silicone-polyurethane resin (solid content: 20%; "Diallomer", trade mark; product of Dainichiseika Color & Chemicals Mfg. Co., Ltd.), 318 parts of methyl ethyl ketone, 0.5 part of water and 0.01 part of tin octylate were mixed and stirred thoroughly, whereby a coating formulation of the present invention for the formation of the back layer of a heat-sensitive recording material was obtained.

Example 5

The resin solution (C) (100 parts) obtained in Referential Example 3, 300 parts of methyl ethyl ketone, 0.5 part of water and 0.01 part of tin octylate were mixed and stirred thoroughly, whereby a coating formulation of the present invention for the formation of the back layer-of a heat-sensitive recording material was obtained.

Example 6

The resin solution (C) (100 parts) obtained in Referential Example 3, 60 parts of a polyvinyl butyral resin (solid content: 20%; product of Sekisui Plastics Co., Ltd.), 336 parts of methyl ethyl ketone, 0.5 part of water and 0.01 part of tin octylate were mixed and stirred thoroughly, whereby a coating formulation of the present invention for the formation of the back layer of a heat-sensitive recording material was obtained.

Comparative Example 1

In a mixed solvent consisting of 200 parts of methyl ethyl ketone and 50 parts of toluene, 150 parts of polybutylene adipate (molecular weight: 2,000) and 15 parts of 1,3-butanediol were dissolved. While the resulting solution was stirred thoroughly at 60° C., a solution of 62 parts of hydrogenated MDI in 171 parts of methyl ethyl ketone was gradually added dropwise. After the dropwise addition was completed, they were reacted at 80° C. for 6 hours.

The resin solution thus prepared had a solid content of 40% and a viscosity of 24,000 cps (20° C.).

In addition, the solid concentration of the resin solution was adjusted to 12.5% with methyl ethyl ketone, whereby a comparative coating formulation was obtained.

Comparative Example 2

The resin solution (100 parts) prepared in Comparative Example 1, 3 parts of "Teflon" powder (product of Daikin Industries, Ltd.), 2 parts of polyethylene wax and 255 parts of methyl ethyl ketone/toluene (=1/1) were mixed into a liquid mixture.

To the above liquid mixture, an isocyanate (solid content: 75%; product of Nippon Polyurethane Industry Co., Ltd.) was added in an amount to give a liquid mixture/isocyanate weight ratio of 24/3, whereby a comparative coating formulation was obtained.

Comparative Example 3

In 1,000 parts of toluene, 100 parts of a silicone resin ("KS-841", trade name; product of ShinEtsu Chemical Co., Ltd.) and 1 part of a catalyst ("PL7", trade name) were dissolved, whereby a comparative coating formulation of the silicone resin was obtained.

Evaluation

Each of the coating formulations prepared in Examples 1–6 and Comparative Examples 1–3, respectively, was coated by a gravure coater onto the surface of a 6 μm thick polyethylene terephthalate film (product of Toray Industries, Inc.) to give a dry coat thickness of 0.3 μm. The solvent was then caused to evaporate in a drier, whereby a heat-resistant, lubricious back layer was formed on one side of the base film for a comparison test.

The other side of the base film, which was opposite to the back layer formed as described above, was coated with an ink formulation of the below-described composition to give a coat thickness of 5 μm by roll coating after the ink formulation had been heated at 100° C. into a hot melt, whereby a transfer ink layer was formed for a comparison test. In this manner, various heat-sensitive transfer materials were obtained using the coating formulations prepared in Examples 1–6 and Comparative Examples 1–3, respectively.

| Ink composition | |
|---|---|
| Paraffin wax | 10 parts |
| Carnauba wax | 10 parts |
| Polybutene (product of Nippon Oil Company Ltd.) | 1 part |
| Carbon black | 2 parts |

Using the heat-sensitive recording materials obtained as described above, printing was conducted by a thin-film type thermal head under the condition of printing energy of 1 mJ/dot ($4 \times 10^{-4}$ cm$^2$).

Sticking tendency, head smear, adhesion and coefficient of static friction were observed or measured at that time to evaluate them. Incidentally, these physical property tests were conducted after the heat-sensitive recording materials had been left over for 3 days at room temperature (23° C., 46% humidity). The results are shown in Table 1.

The sticking tendency was evaluated by subjecting each heat-sensitive recording material to a thermal recording test on an actual thermal printer and visually ranking in 5 stages the separability of the heat-sensitive recording material from the thermal head when the thermal head was pressed against the heat-sensitive recording material. The heat-sensitive recording materials showed the best separability were ranked "5".

The head smear was evaluated by subjecting each heat-sensitive recording material to a thermal recording test on an actual thermal printer and visually observing the state of smear of the thermal head. The ranking was in 5 stages with "5" indicating the least smear.

Adhesion of the back layer was evaluated by a cross-hatching peeling test with an adhesive cellophane tape.

A coefficient of static friction was evaluated by measuring that of the heat-resistant lubrication layer by using a surface property tester (manufactured by Shinto Kagaku Corp.)

TABLE 1

| | Sticking tendency | Head smear | Adhesion | Coefficient of static friction |
|---|---|---|---|---|
| Ex.1 | 5 | 5 | 100/100 | 0.08 |
| Ex.2 | 5 | 5 | 100/100 | 0.09 |
| Ex.3 | 5 | 5 | 100/100 | 0.08 |
| Ex.4 | 5 | 5 | 100/100 | 0.09 |
| Ex.5 | 5 | 5 | 100/100 | 0.08 |
| Ex.6 | 5 | 5 | 100/100 | 0.10 |
| Comp.Ex.1 | 1* | — | 0/100 | 0.65 |
| Comp.Ex.2 | 4 | 3 | 20/100 | 0.32 |
| Comp.Ex.3 | 5 | 2 | 100/100 | 0.09 |

*Head was not allowed to run and the recording material was torn up.

As is apparent from Table 1, the coating formulation according to the present invention is low in the friction coefficient of the back layer and is rather free from sticking tendency and head smear so that a heat-sensitive recording material having excellent properties can be provided.

The heat-sensitive recording material contains one or more hydrolyzable silyl groups and free isocyanates in its back layer so that the back layer can be crosslinked by moisture in the air. The resin can therefore be provided in the form of a single-pack curable form, leading to simplification in the forming steps of the back layer.

Referential Example 4

While 150 parts of an adduct of hexamethylene diisocyanate and water ("Duraconate 24A-100", trade name; product of Asahi Chemical Industry Co., Ltd.; NCO %=23.5) and 100 parts of ethyl acetate were stirred thoroughly at 80° C., 12 parts of hydroxyl-terminated polydimethylsiloxane (molecular weight: 2,200) having a structure represented by the following formula:

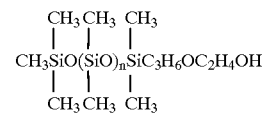

(wherein n is a value to give a molecular weight of 2,200) were gradually added dropwise and were reacted for 4 hours. The reaction mixture was thereafter cooled to 40° C. While thoroughly stirring, 123 parts of 3-aminopropyltriethoxysilane were gradually added dropwise to the reaction mixture, followed by reaction, whereby the reaction product (4) was obtained.

In an infrared absorption spectrum of the reaction product (4) so obtained, an absorption band based on —SiO— groups was observed at 1,090 cm$^{-1}$.

As a final step, ethyl acetate was added to the reaction product to obtain a resin solution (D) having a solid content of 50%.

Referential Example 5

While 200 parts of an adduct of trimethylol propane and toluene-2,4-diisocyanate at a molar ratio of 1:3 ("Colonate L", trade name; product of Nippon Polyurethane Co., Ltd.; NCO %=13.0; solid content: 75%) and 100 parts of ethyl acetate were stirred thoroughly at 80° C., 12 parts of polydimethylsiloxane (molecular weight: 3,200) which has hydroxyl groups at both ends thereof and is represented by the following formula:

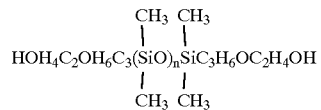

(wherein n is a value to give a molecular weight of 3,200) were gradually added dropwise for reaction.

The resulting mixture was then cooled to 40° C. Under thorough stirring, 77 parts of N-ethyl-γ-aminopropyltriethoxysilane were gradually added dropwise to the mixture, followed by reaction, whereby a reaction product (5) was obtained.

In an infrared absorption spectrum of the reaction product (5) so obtained, an absorption band based on —SiO— groups was observed at 1,090 cm$^{-1}$.

As a final step, ethyl acetate was added to the reaction product (5) to obtain a resin solution (B) having a solid content of 50%.

Referential Example 6

While 150 parts of a trimer of hexamethylene diisocyanate ("Colonate EH", trade name; product of Nippon Polyurethane Co., Ltd.; NCO %=21.3) and 100 parts of ethyl acetate were stirred thoroughly at 80° C., 10 parts of polydimethylsiloxane (molecular weight: 2,200) which has a similar structure to that of Referential Example 1 were gradually added dropwise, followed by reaction.

While thoroughly stirring at 50° C., 7 parts of polydimethylsiloxane (molecular weight: 1,800) which has amino groups at both ends thereof and is represented by the following formula:

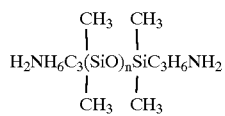

(wherein n is a value to give a molecular weight of 1,800) were gradually added dropwise. To the resultant mixture, 97 parts of γ-mercaptopropyltrimethoxysilane were gradually added dropwise and reacted, whereby the reaction product (6) was obtained.

In an infrared absorption spectrum of the reaction product (6) so obtained, an absorption band based on —SiO— groups was observed at 1,090 cm$^{-1}$.

As a final step, ethyl acetate was added to the reaction product (6) to obtain a resin solution (F) having a solid content of 50%.

Example 7

The resin solution (D) (100 parts) obtained in Referential Example 4, 300 parts of methyl ethyl ketone, 0.5 part of water and 0.01 part of tin octylate were mixed and stirred thoroughly, whereby a coating formulation of the present invention for the formation of the back layer of a heat-sensitive recording material was obtained.

Example 8

The resin solution (D) (100 parts) obtained in Referential Example 4, 20 parts of a nitrocellulose resin (solid content: 20%; product of Daicel Chemical Industries, Ltd.), 312 parts of methyl ethyl ketone, 0.5 part of water and 0.01 part of tin octylate were mixed and stirred thoroughly, whereby a coating formulation of the present invention for the formation of the back layer of a heat-sensitive recording material was obtained.

Example 9

The resin solution (E) (100 parts) obtained in Referential Example 5, 300 parts of methyl ethyl ketone, 0.5 part of water and 0.01 part of tin octylate were mixed and stirred thoroughly, whereby a coating formulation of the present invention for the formation of the back layer of a heat-sensitive recording material was obtained.

Example 10

The resin solution (E) (100 parts) obtained in Referential Example 5, 30 parts of a silicone-polyurethane resin (solid content: 20%; "Diallomer", trade mark; product of Dainichiseika Color & Chemicals Mfg. Co., Ltd.), 318 parts of methyl ethyl ketone, 0.5 part of water and 0.01 part of tin octylate were mixed and stirred thoroughly, whereby a coating formulation of the present invention for the formation of the back layer of a heat-sensitive recording material was obtained.

Example 11

The resin solution (F) (100 parts) obtained in Referential Example 6, 300 parts of methyl ethyl ketone, 0.5 part of water and 0.01 part of tin octylate were mixed and stirred thoroughly, whereby a coating formulation of the present invention for the formation of the back layer of a heat-sensitive recording material was obtained.

Example 12

The resin solution (F) (100 parts) obtained in Referential Example 6, 60 parts of a polyvinyl butyral resin (solid content: 20%; product of Sekisui Plastics Co., Ltd.), 336 parts of methyl ethyl ketone, 0.5 part of water and 0.01 part of tin octylate were mixed and stirred thoroughly, whereby a coating formulation of the present invention for the formation of the back layer of a heat-sensitive recording material was obtained.

Evaluation

As described in the evaluation for the coating formulations prepared in Examples 1–6, a back layer was formed on one side of a polyethylene terephthalate film using each of the back-layer coating formulations prepared in Examples 7–12 and a transfer ink layer was formed on the other side of the film, whereby a heat-sensitive recording material was obtained. The heat-sensitive recording material so obtained was evaluated in a similar manner to Examples 1–6. The results are shown in Table 2.

TABLE 2

|  | Sticking tendency | Head smear | Adhesion | Coefficient of static friction |
| --- | --- | --- | --- | --- |
| Ex.7 | 5 | 5 | 100/100 | 0.10 |
| Ex.8 | 5 | 5 | 100/100 | 0.09 |
| Ex.9 | 5 | 5 | 100/100 | 0.09 |
| Ex.10 | 5 | 5 | 100/100 | 0.08 |
| Ex.11 | 5 | 5 | 100/100 | 0.10 |
| Ex.12 | 5 | 5 | 100/100 | 0.10 |
| Comp.Ex.1 | 1* | — | 0/100 | 0.65 |
| Comp.Ex.2 | 4 | 3 | 20/100 | 0.32 |
| Comp.Ex.3 | 5 | 2 | 100/100 | 0.09 |

*Head was not allowed to run and the recording material was torn up.

As is apparent from Table 2, the coating formulation according to the present invention is low in the friction coefficient of the back layer and is rather free from sticking tendency and head smear so that a heat-sensitive recording material having excellent properties can be provided.

The heat-sensitive recording material contains one or more hydrolyzable silyl groups in its back layer so that the back layer can be crosslinked by moisture in the air. The resin can therefore be provided in the form of a single-pack curable form, leading to simplification in the forming steps of the back layer.

Referential Example 7

While 150 parts of an adduct of hexamethylene diisocyanate and water ("Duraconate 24A-100", trade name; product of Asahi Chemical Industry Co., Ltd.; NCO %=23.5) and 100 parts of ethyl acetate were stirred thoroughly at 80° C., 5 parts of hydroxyl-terminated polydimethylsiloxane (molecular weight: 2,200) having the structure represented by the following formula:

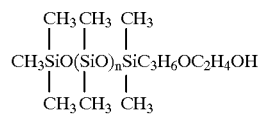

(wherein n is a value to give a molecular weight of 2,200) were gradually added dropwise and were reacted. At the same temperature, 20 parts of polybutylene adipate polyol having an average molecular weight of 2,000 were added to the reaction mixture and they were reacted, whereby the reaction product (7) was obtained.

In an infrared absorption spectrum of the reaction product (7) so obtained, an absorption by free isocyanate groups was observed at 2,270 $cm^{-1}$ and an absorption band based on —SiO— groups was also observed at 1,090 $cm^{-1}$.

As a result of a quantitative analysis of free isocyanate groups of the reaction product (7), their content was found to be 17.6% while the theoretical value is 19.5%.

As a final step, ethyl acetate was added to the reaction product to obtain a resin solution (G) having a solid content of 50%.

Referential Example 8

While 200 parts of an adduct of trimethylol propane and toluene-2,4-diisocyanate at a molar ratio of 1:3 ("Colonate L", trade name; product of Nippon Polyurethane Co., Ltd.; NCO %=13.0; solid content: 75%) and 100 parts of ethyl acetate were stirred thoroughly at 80° C., 10 parts of polydimethylsiloxane (molecular weight: 3,200) which has hydroxyl groups at both ends thereof and is represented by the following formula:

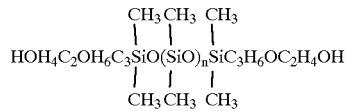

(wherein n is a value to give a molecular weight of 3,200) were gradually added dropwise for reaction.

At the same temperature, 25 parts of polycaprolactone polyester polyol having an average molecular weight of about 2,000 were added and reacted, whereby a reaction product (8) was obtained.

In an infrared absorption spectrum of the reaction product (8) so obtained, an absorption by free isocyanate groups was observed at 2,270 $cm^{-1}$ and an absorption band based on —SiO— groups was also observed at 1,090 $cm^{-1}$.

As a result of a quantitative analysis of free isocyanate groups in the reaction product (8), their content was found to be 11.7% while the theoretical value is 13.2%.

As a final step, ethyl acetate was added to the reaction product (8) to obtain a resin solution (H) having a solid content of 50%.

Referential Example 9

While 150 parts of a trimer of hexamethylene diisocyanate ("Colonate EH", trade name; product of Nippon Polyurethane Co., Ltd.; NCO %=21.3) and 100 parts of ethyl acetate were stirred thoroughly at 80° C., 10 parts of polydimethylsiloxane (molecular weight: 2,200) which has a similar structure to that of Referential Example 1 were gradually added dropwise and they were reacted.

While thoroughly stirring them at 40° C., 5 parts of polydimethylsiloxane (molecular weight: 1,800) which has amino groups at both ends thereof and is represented by the following formula:

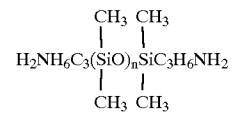

(wherein n is a value to give a molecular weight of 1,800) were gradually added dropwise and reacted, whereby the reaction product (9) was obtained.

In an infrared absorption spectrum of the reaction product (9) so obtained, an absorption by free isocyanate groups was observed at 2,270 $cm^{-1}$ and an absorption band based on —SiO— groups was also observed at 1,090 $cm^{-1}$.

As a result of a quantitative analysis of free isocyanate groups in the reaction product (9), their content (in terms of a purity content) was found to be 19.0% while the theoretical value is 17.2%.

As a first step, ethyl acetate was added to the reaction product (9) to obtain a resin solution (I) having a solid content of 50%.

Example 13

The resin solution (G) (100 parts) obtained in Referential Example 7 and 300 parts of methyl ethyl ketone were mixed and stirred thoroughly, whereby a coating formulation of the present invention for the formation of the back layer of a heat-sensitive recording material was obtained.

Example 14

The resin solution (G) (100 parts) obtained in Referential Example 7, 10 parts of a nitrocellulose resin (solid content: 20%; product of Daicel Chemical Industries, Ltd.) and 306 parts of methyl ethyl ketone were mixed and stirred thoroughly, whereby a coating formulation of the present invention for the formation of the back layer of a heat-sensitive recording material was obtained.

Example 15

The resin solution (H) (100 parts) obtained in Referential Example 8 and 300 parts of methyl ethyl ketone were mixed and stirred thoroughly, whereby a coating formulation of the present invention for the formation of the back layer of a heat-sensitive recording material was obtained.

Example 16

The resin solution (H) (100 parts) obtained in Referential Example 8, 10 parts of a silicone-polyurethane resin (solid content: 20%; "Diallomer", trade mark; product of Dainichiseika Color & Chemicals Mfg. Co., Ltd.) and 306 parts of methyl ethyl ketone were mixed and stirred thoroughly, whereby a coating formulation of the present invention for the formation of the back layer of a heat-sensitive recording material was obtained.

Example 17

The resin solution (I) (100 parts) obtained in Referential Example 9 and 300 parts of methyl ethyl ketone were mixed and stirred thoroughly, whereby a coating formulation of the present invention for the formation of the back layer of a heat-sensitive recording material was obtained.

Example 18

The resin solution (I) (100 parts) obtained in Referential Example 9, 10 parts of a polyvinyl butyral resin (solid content: 20%; product of Sekisui Plastics Co., Ltd.) and 306 parts of methyl ethyl ketone were mixed and stirred thoroughly, whereby a coating formulation of the present invention for the formation of the back layer of a heat-sensitive recording material was obtained.

As described in the evaluation for the coating formulations prepared in Examples 1–6, a back layer was formed on one side of a polyethylene terephthalate film using each of the back-layer coating formulations prepared in Examples 13–16 and a transfer ink layer was formed on the other side of the film, whereby a heat-sensitive recording material was obtained. The material so obtained was evaluated in a similar manner to Examples 1–6. The results are shown in Table 3.

TABLE 3

|  | Sticking tendency | Head smear | Adhesion | Coefficient of static friction |
| --- | --- | --- | --- | --- |
| Ex.13 | 5 | 5 | 100/100 | 0.08 |
| Ex.14 | 5 | 5 | 100/100 | 0.10 |
| Ex.15 | 5 | 5 | 100/100 | 0.09 |
| Ex.16 | 5 | 5 | 100/100 | 0.08 |
| Ex.17 | 5 | 5 | 100/100 | 0.08 |
| Ex.18 | 5 | 5 | 100/100 | 0.10 |
| Comp.Ex.1 | 1* | — | 0/100 | 0.65 |
| Comp.Ex.2 | 4 | 3 | 20/100 | 0.32 |
| Comp.Ex.3 | 5 | 2 | 100/100 | 0.09 |

*Head was not allowed to run and the recording material was torn up.

As is apparent from Table 3, the coating formulation according to the present invention is low in the friction coefficient of the back layer and is rather free from sticking tendency and head smear so that a heat-sensitive recording material having excellent properties can be provided.

The heat-sensitive recording material contains one or more free isocyanates in its back layer so that the back layer can be crosslinked by moisture in the air. The resin can therefore be provided in the form of a single-pack curable form, leading to simplification in the forming process of the back layer.

I claim:

1. A heat-sensitive recording material comprising a base sheet material, a heat-sensitive recording layer provided on one side of the base sheet material and a back layer provided on the other side of the base sheet material, said back layer having been coated with a coating formulation, which comprises:

in a liquid medium, a reaction product obtained by reacting (a) a polysiloxane compound containing at least one functional group reactive with an isocyanate group, (b) a hydrolyzable silyl group of the formula:

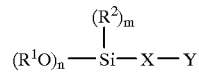

wherein Y is a functional group selected from the group consisting of amino, epoxy, hydroxyl and thiol, X is a divalent organic group, $R^1$ is lower alkyl, $R^2$ is lower alkyl or lower alkoxy, m is 0 or an integer of 1–3 and n=3−m, and (c) a polyisocyanate, said reaction product being free of any free isocyanate group but containing a free hydrolyzable silyl group.

2. The heat-sensitive recording material according to claim 1, wherein in the coating formulation the functional group reactive with an isocyanate group is a member selected from the group consisting of amino, hydroxyl, mercapto, carboxyl and epoxy groups.

3. The heat-sensitive recording material according to claim 1, wherein in the coating formulation the hydrolyzable silyl group is an alkoxy group.

4. The heat-sensitive recording material according to claim 1, wherein the coating formulation further comprises a binder.

5. The heat-sensitive recording material according to claim 1, wherein the temperature in the reaction to prepare said reaction product ranges from 0–150° C.

6. The heat-sensitive recording material according to claim 1, wherein in the coating formulation to prepare said reaction product, from 1–3 moles of (a) is reacted with 1–3 moles of (b) and 1–2 moles of (c).

7. The heat-sensitive recording material according to claim 1, wherein in (b) the divalent organic group X is an aliphatic, aromatic or aliphatic aromatic group, which optionally contains at least one O, N, S atom as a structural component of the group X.

* * * * *